United States Patent [19]

Kobus et al.

[11] 3,930,235

[45] Dec. 30, 1975

[54] DATA PROCESSING SYSTEM

[75] Inventors: Stanislas Kobus, Palaiseau, France; Juliaan Leo Gerard Janssens, Olmen; Willy Charles Jacques Zoile, St. Niklaas, both of Belgium

[73] Assignee: International Standard Electric Corporation, New York, N.Y.

[22] Filed: Nov. 29, 1972

[21] Appl. No.: 310,509

[30] Foreign Application Priority Data

Dec. 10, 1971 Belgium .............................. 776495

[52] U.S. Cl. .............................................. 340/172.5

[51] Int. Cl. .......................... G06f 13/08; G06f 7/38

[58] Field of Search .................................. 340/172.5

[56] References Cited

UNITED STATES PATENTS 3,394,350 7/1968 Packard .......................... 340/172.5

3,504,349 3/1970 Wallis ............................. 340/172.5

*Primary Examiner*—Raulfe B. Zache

*Assistant Examiner*—Jan E. Rhoads

*Attorney, Agent, or Firm*—John T. O'Halloran; Menotti J. Lombardi, Jr.; Vincent Ingrassia

[57] ABSTRACT

This case describes a find-first-one (FFO) instruction which is used to scan a table of 16-bit words which are successively addressed and loaded in an accumulator, the address being obtained by indexing the address of the first word with the contents of an index register which are successively increased by 1. Each time a word has been stored in the accumulator a find first one instruction FFO is executed. This instruction finds the leftmost 1-bit in this word, resets this bit in this word, and shifts the contents of the index register by four positions to the left. In this way the contents of the index register directly indicate the position of the leftmost 1-bit in the table.

1 Claim, 3 Drawing Figures

DATA PROCESSING SYSTEM

The present invention relates to a data processing system with a processor and a memory storing a plurality of data words constituted by bits, said processor including an index register to store the relative address of a data word in a table of said memory, means to access this word from said table by using said relative address, and means to determine the position of the first bit of said word having a predetermined one of two conditions, all said bits of said word being ordered in a predetermined way.

Such a data processing system is already known from the Bell System Technical Journal, September 1964, No 5, Part 1, pages 1869–1870 and 1937. In this known system the bit position in the table thus determined is used to access a word from a second table. Since the number of bit positions in a word of the first table is relatively small only a like small number of words in the second table can be accessed.

An object of the present invention is therefore to provide a data processing system of the above type which permits to access a number of words from the second table which is a multiple of the number of bit positions in a word of the first table.

The present data processing system is particularly characterized in that said processor further includes means to combine said relative address and said position of said first bit in said word to obtain the position of said first bit in said memory table.

Another disadvantage of the above mentioned known data processing system is that, to access a word from the second table by using the bit position determined, an additional index register is required.

Another object of the present invention is therefore to provide a data processing system of the above type wherein no additional index register is required to access a word from the second table.

The present data processing system is also characterized in that said means to combine said relative address and said bit position in said word include means to juxtapose in said index register said bit position in said word and said relative address to obtain said bit position in said memory table.

The present invention also relates to a data processing system including a plurality of information storage devices, common communication means, gating means between said storage devices and said common communication means, control means to control said gating means in order to enable the transfer of information between said storage devices via said common communication means, and an adder circuit with which said storage devices are coupled, said adder circuit having an augend input, an addend input and a summing output.

Such a data processing system is well known in the computer art and it is a further object of the present invention to provide a data processing system wherein an optimum use is made of the adder circuit.

According to the present invention this object is attained due to the fact that said common communication means are constituted by said adder circuit, the one and the other storage devices of each pair of storage devices between which information must be transferred being coupled to at least one of said adder circuit inputs and to said adder circuit output via said gating means respectively.

In accordance with a preferred embodiment of the invention the present data processing system includes a memory and a processor with an index register, an accumulator register, an adder circuit having 16 augend inputs, 16 addend inputs and 16 summing outputs, and a find-first-one circuit the 16 inputs of which are coupled to the 16 outputs of the accumulator register and the four outputs of which are coupled to the last four augend inputs, whilst the 12 remaining augend inputs are coupled to the last 12 outputs of the index register. The 16 summing outputs of the adder circuit are coupled to the 16 inputs of the index register. After a word of a first table has been accessed by using a relative address (of this word in this table) stored in the index register and after this word has been stored in the accumulator register, the system is able to execute a find-first-one instruction on this word. This instruction consists in operating the find-first-one circuit to find the leftmost 1-bit in the word stored in the accumulator register, to apply the bit position then appearing at the outputs of this circuit and a portion of the contents of the index register to the above mentioned augend inputs and to insert the result appearing at the above summing outputs in the index register. This index register thus indicates the position in the table of the leftmost bit found, this position constituting the relative address of a word of a second table.

The above mentioned and other objects and features of the invention will become more apparent and the invention itself will be best understood by referring to the following description of an embodiment taken in conjunction with the accompanying drawings wherein.

Figure 1:
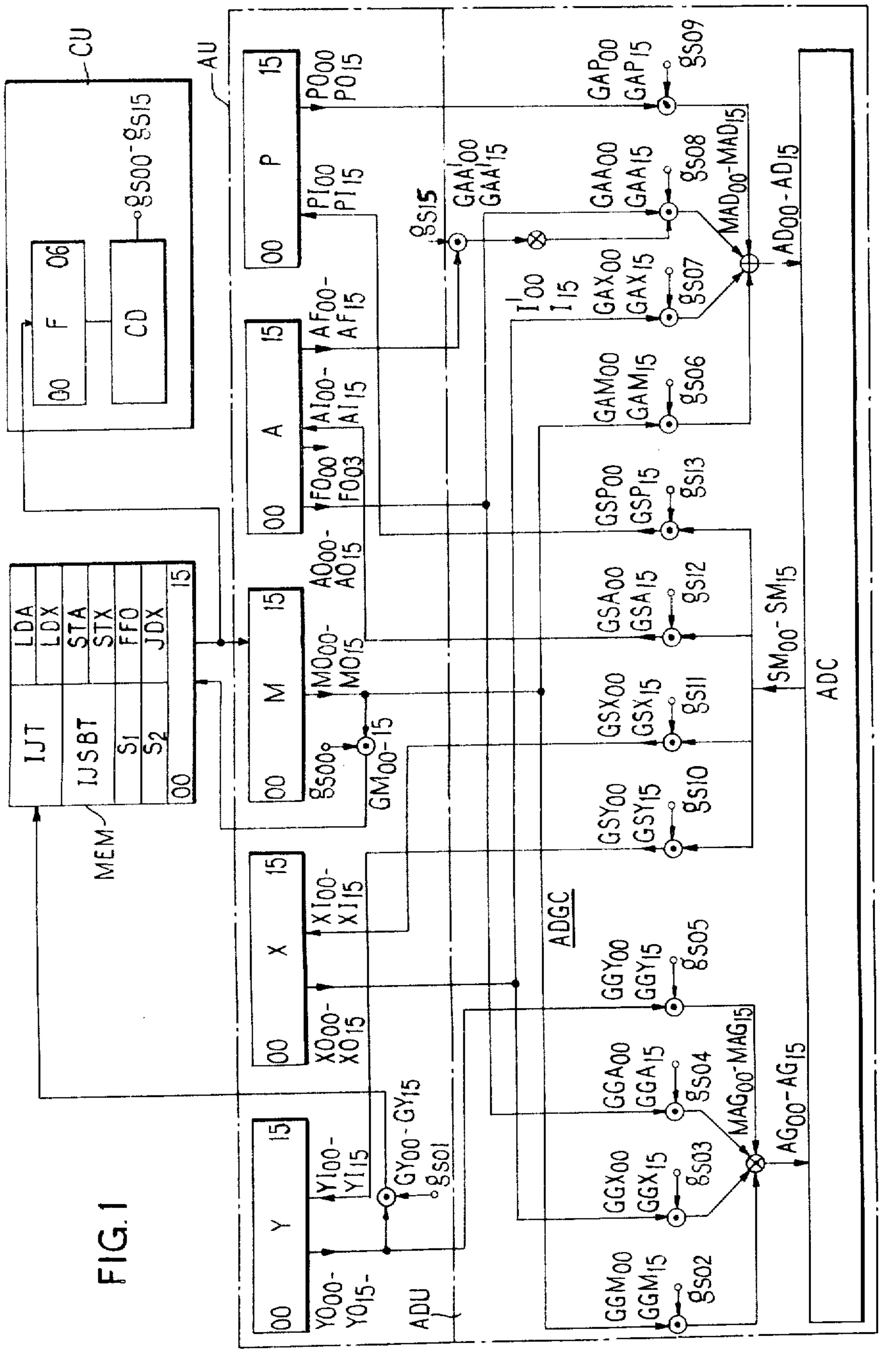
FIG. 1 represents a data processing system according to the present invention.

Principally referring to FIG. 1 the data processing system shown therein is constituted by a memory MEM and by a processor constituted by an arithmetic unit AU and a control unit CU.

The memory MEM is adapted to store a plurality of 16-bit instruction words such as LDA, LDX, STA, STX, FFO and JDX and a plurality of 16-bit data words such as S1 and S2. The memory further includes the tables of data words IJT and IJSBT.

The arithmetic unit AU includes a 16-bit buffer register M, a 16-bit memory location register Y, a 16-bit index register X, a 16-bit accumulator register A, a 16-bit programme counter P to store the address of an instruction being or to be executed and a well known adder unit ADU constituted by an adder gating circuit ADGC and an adder circuit ADC proper.

The control unit CU includes a control device CD to control the various operations of the system by generating gating signals $gs_{00}$–$gs_{15}$ at the appropriate times and a 7-bit register F to store the operation code of an instruction. The register F is connected to the control device CD. It should be noted that the gating signals $gs_{00}$ to $gs_{15}$ are in fact each constituted by 15 signals $gs_{00(00)}$–$gs_{00(15)}$ to $gs_{15(00)}$–$gs_{15(15)}$, as will become clear later.

The inputs of the cells $_{00}$ to $_{15}$ of the memory register M are coupled to the outputs of the corresponding output cells $_{00}$ to $_{15}$ of the memory MEM is schematically indicated by the arrow interconnecting MEM and M and pointing to M. The inputs of the seven cells $_{00}$ to $_{06}$ of the register F are connected to the outputs of the corresponding cells $_{00}$ to $_{06}$ of the memory MEM as also schematically indicated by the arrow interconnecting MEM and F and pointing to F. The outputs $MO_{00}$–$MO_{15}$ of the cells $_{00}$ to $_{15}$ of the memory register M are connected to the inputs of the output cells $_{00}$ to $_{15}$ of memory MEM via gating means $GMM_{00}$–$GMM_{15}$ controlled by the gating signals $gs_{00}$ generated by the control device CD. The outputs $YO_{00}$–$YO_{15}$ of the cells $_{00}$ to $_{15}$ of the register Y are connected to the addressing input of the memory MEM as schematically indicated by the arrow interconnecting Y and MEM and point to MEM. This connection includes the AND-gates $GY_{00}$ to $GY_{15}$ which are controlled by the gating signals $gs_{01}$ provided by the control device CD.

The outputs $MO_{00}$–$MO_{15}$, $XO_{00}$–$XO_{15}$, $AO_{00}$–$AO_{15}$ and $YO_{00}$–$YO_{15}$ of the cells $_{00}$ to $_{15}$ of the memory register M, of the index register X, of the accumulator A and of the register Y are connected to the augend inputs $AG_{00}$ to $AG_{15}$ of the adder circuit ADC via the individual AND-gates $GGM_{00}$–$GGM_{15}$, $GGX_{00}$–$GGX_{15}$, $GGA_{00}$–$GGA_{15}$ and $GGY_{00}$–$GGY_{15}$ respectively and via the common OR-gates $MAG_{00}$–$MAG_{15}$. These four groups of AND-gates are controlled by the gating signals $gs_{02}$ to $gs_{05}$ generated by the control device CD respectively. The outputs $MO_{00}$–$MO_{15}$, $XO_{00}$–$XO_{15}$, $AO_{00}$–$AO_{15}$, $PO_{00}$–$PO_{15}$ of the cells $_{00}$ to $_{15}$ of the memory register M, of the index register X, of the accumulator A and of the programme counter P are connected to the addend inputs $AD_{00}$ to $AD_{15}$ of the adder circuit ADC via the individual AND-gates $GAM_{00}$–$GAM_{15}$, $GAX_{00}$–$GAX_{15}$, $GAA_{00}$–$GAA_{15}$, $GAP_{00}$–$GAP_{15}$ respectively and via the common OR-gates $MAD_{00}$–$MAD_{15}$. These four groups of AND gates are controlled by the gating signals $gs_{06}$ and $gs_{09}$ generated by the control device CD. The 16 sum outputs $SM_{00}$–$SM_{15}$ of the adder circuit ADC are connected to the inputs $YI_{00}$–$YI_{15}$, $XI_{00}$–$XI_{15}$, $AI_{00}$–$AI_{15}$ and $PI_{00}$–$PI_{15}$ of the cells $_{00}$ to $_{15}$ of the registers Y, X, A and of the counter P via the AND-gates $GSY_{00}$–$GSY_{15}$, $GSX_{00}$–$GSX_{15}$, $GSA_{00}$–$GSA_{15}$ and $GSP_{00}$–$GSP_{15}$ which are controlled by the gating signals $gs_{10}$ to $gs_{13}$ respectively. The above mentioned AND- and OR-gates connected to the adder circuit ADC form the adder gating circuit ADGC.

It should be noted that the register A has further outputs $AF_{00}$ to $AF_{15}$ which are connected to third inputs of the AND-gates $GAA_{00}$ to $GAA_{15}$ via the AND-gates $GAA'_{00}$ to $GAA'_{15}$ which are controlled by the gating signals $gs_{15}$ and the inverters $I'_{00}$ to $I'_{15}$ respectively. The register A also has outputs $FO_{00}$ to $FO_{03}$ which are connected to the adder circuit ADC, as will be explained later.

Figure 2:
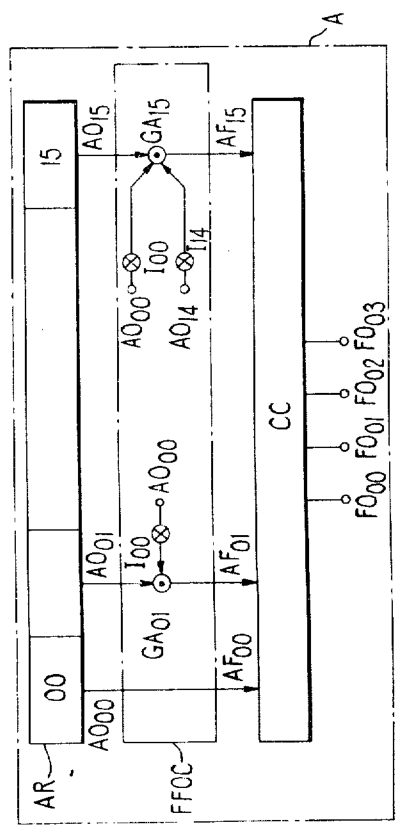
FIG. 2 shows the register A of FIG. 1 in more detail.

Principally referring to FIG. 2 the register A shown therein includes the register AR proper with the above mentioned cells $_{00}$ to $_{15}$ having the outputs $AO_{00}$ to $AO_{15}$. These outputs are connected to a find-first-one circuit FFOC including 15 AND-gates $GA_{01}$ to $GA_{15}$ the one inputs of which are connected to the outputs $AO_{01}$ to $AO_{15}$ of the register AR respectively. The other inputs of each of these AND-gates $GA_{01}$ to $GA_{15}$ are each connected via an inverter to all those of the outputs $AO_{00}$ to $AO_{15}$ which precede the gate in the row shown e.g. the single other input of the AND-gate $GA_{01}$ is connected to the output of the single preceding output $AO_{00}$ via the inverter $I_{00}$; the 14 other inputs of the AND-gate $GA_{15}$ are connected to the outputs of the 14 preceding outputs $AO_{00}$ to $AO_{14}$ via the inverters $I_{00}$ to $I_{14}$ respectively. The outputs $AF_{01}$ to $AF_{15}$ of the AND-gates $GA_{01}$ to $GA_{15}$ and the output $AF_{00}$ which is directly connected to the output $AO_{00}$ of the cell $_{00}$of the register AR are connected to the coder circuit CC which is adapted to code the 16-bit code applied to its input in a 4-bit code which then appears at its outputs $FO_{00}$ to $FO_{03}$.

Figure 3:
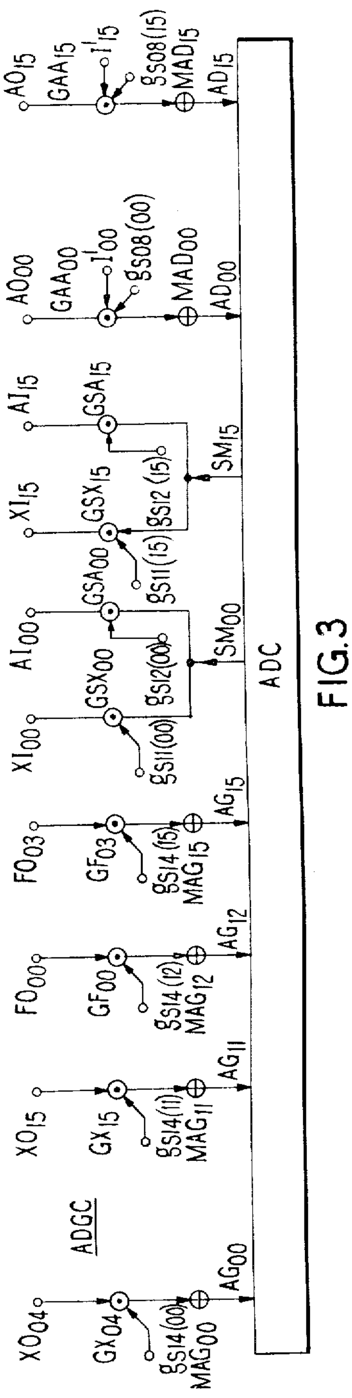
FIG. 3 shows part of the circuit ADGC of FIG. 1 and other circuitry in more detail.

Principally referring to FIG. 3 the latter shows in more detail the connections, already shown in FIG. 1, between the outputs $AO_{00}$ to $AO_{15}$ of the register A and the addend inputs $AD_{00}$ to $AD_{15}$ of the adder circuit ADC and between the summing outputs $SM_{00}$ to $SM_{15}$ of this adder circuit ADC, on the one hand, and the inputs $AI_{00}$ to $AI_{15}$ of the register A and $XI_{00}$ to $XI_{15}$ of the index register X, on the other hand. Hereby the gates $GAA_{00}$–$GAA_{15}$, $GSA_{00}$–$GSA_{15}$ and $GSX_{00}$–$GSX_{15}$ are controlled by the gating signals $gs_{08(00)}$–$gs_{08(15)}$, $gs_{12(00)}$–$gs_{12(15)}$ and $gs_{11(00)}$–$gs_{11(15)}$ respectively.

FIG. 3 also shows connections, not represented in FIG. 1, between the index register outputs $XO_{04}$–$XO_{15}$ and the coder circuit outputs $FO_{00}$–$FO_{03}$, on the one hand, and the augend inputs $AG_{00}$–$AG_{11}$ and $AG_{12}$–$AG_{15}$ of the adder circuit ADC, on the other hand. These connections are realized via the AND-gates $GX_{04}$ to $GX_{15}$ and $GF_{00}$ to $GF_{03}$ respectively, these groups of gates being controlled by the gating signals $gs_{14(00)}$–$gs_{14(11)}$ and $gs_{14(12)}$–$gs_{14(15)}$ respectively, provided by the control device CD.

With regard to the flow charts given at the end of the description the following should be noted with respect to the instructions which will be used in the description of the operation of the data processing system.

Each of the classical instructions LDA, LDX, STA, STX is constituted by a 7-bit function code, including the addressing mode, and a 9-bit address part:

— the LDA(LDX) instructions are adapted to control the replacement of the contents of the register A(X) by those of the memory location found at the effective address, i.e., at the address calculated by means of the address part of the instruction and taking the addressing mode thereof into account. If to find the effective address use is made of the contents of the index register X these instructions are indicated by LDA' (LDX');

— the STA (STX) instructions are adapted to control the replacement of the contents of the memory location found at the effective address by those of the register A(X).

The classical instruction JDX is constituted by a function code and an address part and is adapted to control the following operations:

— decrement the contents of the index register X by one;

— if the result is not zero jump to the instruction having the address stored in the JDX instruction;

— if the result is zero execute the immediately following instruction.

The instruction FFO is constituted by a function code and is adapted to control the execution of the following operations:

— check the contents of the register A;

— if zero skip one instruction;

— if not zero execute the following steps in sequence.

— store the contents of the cells $_{04}$ to $_{15}$ of the register X in the cells $_{00}$ to $_{11}$ thereof;

— store the conditions of the outputs $FO_{00}$ to $FO_{03}$ of the coder circuit CC of the register A in the cells $_{12}$ to $_{15}$ of the register X;

— reset to zero the first 1-bit found in the register A.

Reference being made to the drawings and to the flow charts the operation of the present data processing system is described in detail hereinafter. Hereby it is assumed that this system controls a classical toll telephone switching network (not shown), the data processed being for instance:

— information about the open and closed conditions of the loops formed between calling distant exchanges and incoming junctors of this switching network. These loop conditions are indicated by a 1-bit (closed) or a 0-bit (open) and are stored in the 16-bit words of an incoming junctor table IJT in the memory MEM, one bit being provided per incoming junctor;

— information about the calls being processed and involving the above mentioned incoming junctors, such information being for instance the identity of the register connected to an incoming junctor, the identity of an outgoing junctor connected to an incoming junctor, etc. These status information are stored in the 16-bit words of an incoming junctor status buffer table IJSBT, one such word being for instance provided per incoming junctor.

As will appear from the description the present data processing system is particularly useful to scan only those words of the IJSBT which correspond to incoming junctors to which a closed loop has been established, i.e., for which a 1-bit is registered in the IJT.

First of all it should be noted that at the end of the execution of an instruction the following instruction is already read in the memory MEM and that the instruction read-out is only available after a certain time interval.

It is now supposed that during the execution of an instruction the reading of an LDX instruction in the memory MEM has been started by means of the address of this LDX instruction, this address being stored at that moment in the register Y and in the programme counter P.

A time interval later the addressed 16-bit LDX instruction is received in the register M and the 7-bit function or operation code of this instruction stored in the bits 0 to 6 thereof is transferred into the register F of the control unit CU. This code is decoded in the control device CD which subsequently generates gating signals to control the execution of the various operations indicated by the LDX instruction. Under the control of these gating signals the address part of the LDX instruction stored in the cells $_7$ to $_{15}$ of the memory register M is transferred to the corresponding cells $_7$ to $_{15}$ of the register Y by making use of the adder unit ADU. By using either the augend or the addend inputs of this adder unit ADU the latter functions indeed as a communication bus since the information applied to these augend or addend inputs appears unmodified at the summing outputs of the adder circuit ADC.

The control device CD of the control unit CU activates the control inputs of the gates $GGM_{07}$ to $GGM_{15}$ by means of the gating signals $gs_{01\,(07)}$ to $gs_{01\,(15)}$ and of the gates $GGSY_{07}$ to $GSY_{15}$ by means of the gating signals $gs_{10\,(07)}$ to $gs_{10\,(15)}$ due to which the address part of the LDX instruction is transferred to the cells $_{07}$ to $_{15}$ of the register Y. It is supposed that this address part is the complete or partial address of the memory location wherein the relative address of the last word of the table IJT is stored, this relative address being the address with respect to that of the table, i.e., with respect to the first word of this table.

With the address part stored in the register Y, possibly combined with another address, the memory MEM is then addressed as a result of which the relative address of the last word of the IJT is received in the memory register M. Under control of the control device CD this address is then transferred to the index register X by again making use of the adder unit ADU and more particularly by activating the control inputs of the gates $GGM_{00}$ to $GGM_{15}$ and $GSX_{00}$ to $GSX_{15}$ by means of the gating signals $gs_{03\,(00)}$ to $gs_{03\,(15)}$ and $gs_{11\,(00)}$ to $gs_{11\,(15)}$ respectively.

Previously the programme counter P has been incremented by 1 so that the address of the following instruction to be executed then appears in this counter. Now this address is stored in the register Y and used to address the memory MEM. This instruction is supposed to be an STX instruction. The control device CD also controls the clearing of the M and F registers.

It should be noted that the above described LDX instruction is classical in the computer art and has also been described in relative detail to make clear the use of the adder unit ADU as a communication bus. The LDA, STA, STX and JDX instructions which are also well known per se in the computer art will therefore only be very briefly described hereinafter.

When the STX instruction has been received in the memory register M and its function code has been stored in the register F the control device CD controls the storage of the contents of the X register in the word S1 of the memory MEM without however modifying the contents of this X register. This operation is necessary since the contents of the X register will be modified and since at a certain moment its original contents must be available, as will become clear later. During the execution of this STX instruction the programme counter P is incremented by 1 so that the address of the next instruction which is an LDA' instruction appears therein. This address is also stored in the Y register and used to address the memory MEM. It is supposed that the address stored in the LDA' instruction is the effective address of the first word of the IJT.

After the LDA' instruction has been received in the memory register M and its function code has been stored in the register F the control device CD controls the transfer of the address part of this LDA' instruction from the M register to the Y register. It also controls the storage of the contents of the X register in the Y register and the combination of the effective address of the first word of the IJT and the relative address of the last word of this table to obtain the effective address of this last word. By means of this effective address the memory MEM is addressed so that some time afterwards the last word of the IJT is received in the memory register M from which it is transferred to the register A by making use of the adder unit ADU. Under control of the control device CD the programme counter P is incremented by 1 so that the address of the next instruction which is an FFO instruction appears therein. This address is also stored in the Y register and used to address the memory MEM. Also the M and F registers are cleared.

After the FFO instruction has been received in the memory register M and its function code has been stored in the register F the control device CD controls the various operations indicated by the FFO.

First it is checked whether the contents of the A register are zero or not. This is done by checking the output of an OR-gate (not shown) the inputs of which are connected to the outputs $AO_{00}$ to $AO_{15}$ of this A register.

If the contents of the A register are zero the contents of the programme counter P are incremented by 2 and the address of the JDX instruction which then appears therein is stored in the Y register and used to address the memory MEM. The registers M and F are cleared. After the JDX instruction has been received in the memory register M and its function code has been stored in the register F the control device CD controls the operations indicated by the JDX instruction. More particularly under its control the contents of the X register are decremented by 1 after which it is checked if these contents are different from zero or not by checking the output of an OR-gate (not shown) the inputs of which are connected to the outputs $XO_{00}$ to $XO_{15}$ of the X register. If the contents of the X register are zero the programme counter P is incremented by 1 and the address of the following instruction which then appears therein is stored in the Y register and used to address the memory MEM. The registers M and F are cleared. If the contents of the X register however are not zero the contents of the programme counter P are decremented so that the address of the above STX instruction again appears therein. Consequently the above described operations are then repeated.

If the contents of the A register are different from zero the contents of the programme counter P are incremented by 1 so that the address of the STA instruction appears therein. This address is also stored in the Y register and used to address the memory MEM. The control device CD also controls the execution of the operations indicated by the FFO instruction. Before describing these operations it should be noted that when the word stored in the A register and more particularly in the register AR (FIG. 2) is 0 1 0 0 0 0 0 0 0 0 0 0 0 0 0 0 1 only the input $AF_{01}$ of the coder circuit CC is activated. Indeed:

— the input $AF_{00}$ is not activated since the output $AO_{00}$ is not activated;

— the outputs $AF_{02}$ (not shown) to $AF_{15}$ of the gates $GA_{02}$ (not shown) to $GA_{15}$ are not activated since in the FFOC one of the control inputs of each of these gates is connected to the activated output $A_{01}$ (not shown) via an inverter $I_{01}$ (not shown).

The one-out-of-16 code 0 1 0 0 0 0 0 0 0 0 0 0 0 0 0 0 thus applied to the coder circuit CC by the FFOC is coded therein in a 4-bit binary code 0001 which appears at the outputs $FO_{00}$ to $FO_{03}$. This code indicates that the first 1-bit found is the second bit of the word.

The operations of the FFO instruction controlled by the control device CD are the following, it being supposed that the contents of the X register are 0 0 0 0 0 0 0 0 0 0 0 0 1 1 1 0

This address indicates word 14 of the IJT, i.e., the fifteenth word of this table.

First the conditions 0 0 0 0 0 0 0 0 1 1 1 0 of the outputs $XO_{04}$ to $XO_{14}$ of the cells $_{04}$ to $_{15}$ of the X register and the conditions 0 0 0 1 of the outputs $FO_{00}$ to $FO_{04}$ of the coder circuit CC of the A register are stored in the cells $_{00}$ to $_{15}$ of the X register via the gates $GX_{04}$ to $GX_{15}$, $GF_{00}$ to $GF_{03}$ and $GSX_{00}$ to $GSX_{15}$ of the adder gating circuit ADGC of the adder unit ADU, these gates being controlled by the gating signals $gs_{14\,(00)}$–$gs_{14\,(15)}$ and $gs_{11\,(00)}$–$gs_{11\,(15)}$ generated by the control device CD. In this way the word finally stored in the X register is 0 0 0 0 0 0 0 0 0 1 1 1 0 0 0 0 1

This word indicates the position in the table IJT of the above first bit found. Indeed, it indicates the position 225 in this table and this is correct since the 1-bit found is the second bit of the fifteenth word of this table.

From the above it follows that the position of the first 1-bit in a word of the table IJT has been combined with the position of this word in the table IJT to obtain the position of this first 1-bit in the table IJT.

Afterwards the first 1-bit found in the A register is reset to 0. This is done by storing the contents of all the cells of the A register again in these cells, except for the cell in which the above first 1-bit was found to a 0 being registered in the latter cell. This operation is performed again by using the adder unit ADU and by applying enabling signals $gs_{15\,(00)}$–$gs_{15\,(15)}$, $gs_{08\,(00)}$–$gs_{08\,(15)}$ and $gs_{12\,(00)}$–$gs_{12\,(15)}$ to the control inputs of the gates $GAA'_{00}$ to $GAA'_{15}$, $GAA_{00}$ to $GAA_{15}$ and $GSA_{00}$ to $GSA_{15}$ respectively. Since the outputs of the inverters $I'_{00}$ to $I'_{15}$ form the code word 1 0 1 1 1 1 1 1 1 1 1 1 1 1 1 1, the gates $GAA_{00}$ and $GAA_{02}$ to $GAA_{15}$ are enabled, whereas gate $GAA_{01}$ (not shown) is inhibited. Consequently the conditions of the outputs $AO_{00}$ and $AO_{02}$ to $AO_{15}$, are stored in the cells $_{00}$ and $_{02}$ to $_{14}$ of the A register, whereas a 0 is registered in cell $_{01}$. The following word is hence finally registered in the A register 0 0 0 0 0 0 0 0 0 0 0 0 0 0 0 0 1

When a FFO instruction is executed on this word another first 1-bit will be found.

When the following instruction which is an STA instruction is read from the memory MEM, it is received in the memory register M and the function code of this instruction is stored in the F register. The control device CD then controls the execution of the various operations indicated by this STA instruction. More particularly the contents of the A register are stored in the word S2 of the memory MEM so that it remains available for later use. The address of this word is stored in the address part of the STA instruction. The control device CD also controls the incrementing by 1 of the programme counter P which then indicates the address of an LDA' instruction to be executed. This address is also stored in the Y register and used to address the memory MEM. Further, the control device CD also clears the registers M and F.

After the above LDA' instruction has been received in the memory register M and the function code of this instruction is stored in the F register the control device CD controls the execution of the various operations indicated by this LDA' instruction the address part of which is that of the first word of the table IJSBT. Under the control of this control device CD the latter address is then combined with the address stored in the X register and constituted by the position of a 1-bit in the table IJT to obtain the address of a word in the table IJSBT. By means of the latter address of table IJSBT is then addressed and the information then received in the memory register M is further processed in a way which will not be described here since it is without importance for the present invention.

After this treatment is finished an LDX and an LDA instruction are executed in succession to load in the X and A registers the content of the memory words S1 and S2 respectively. When these operations are finished the already above described operations starting with FFO are repeated, as clearly indicated on the flow charts.

From the above it follows that for each bit position of a word in the table IJT a word from the table IJSBT can be accessed, so that the higher the number of bits in the table IJT the higher the number of words in the table IJSBT may be.

While the principles of the invention have been described above in connection with specific apparatus, it is to be clearly understood that this description is made only by way of example and not as a limitation on the scope of the invention.

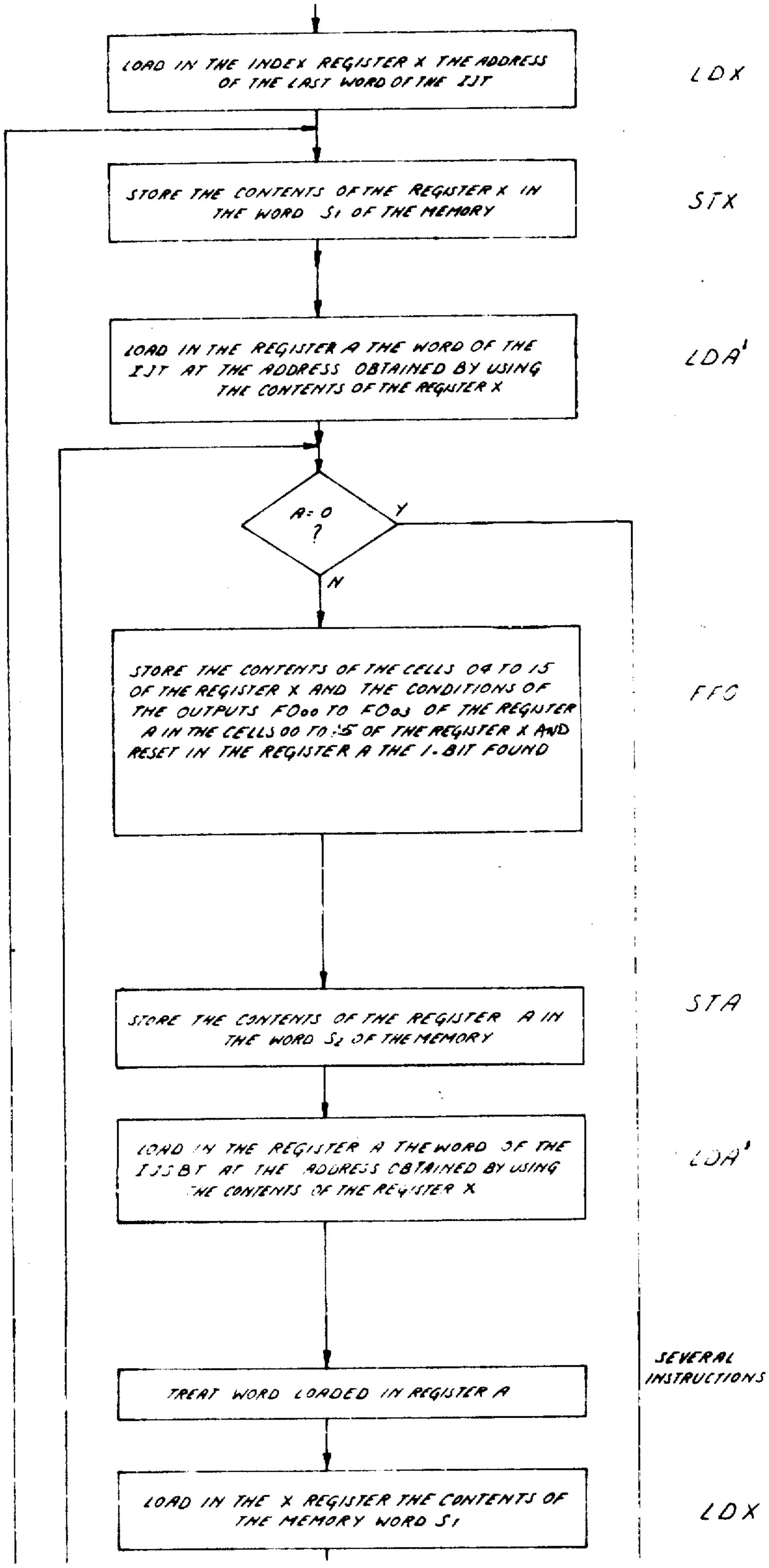

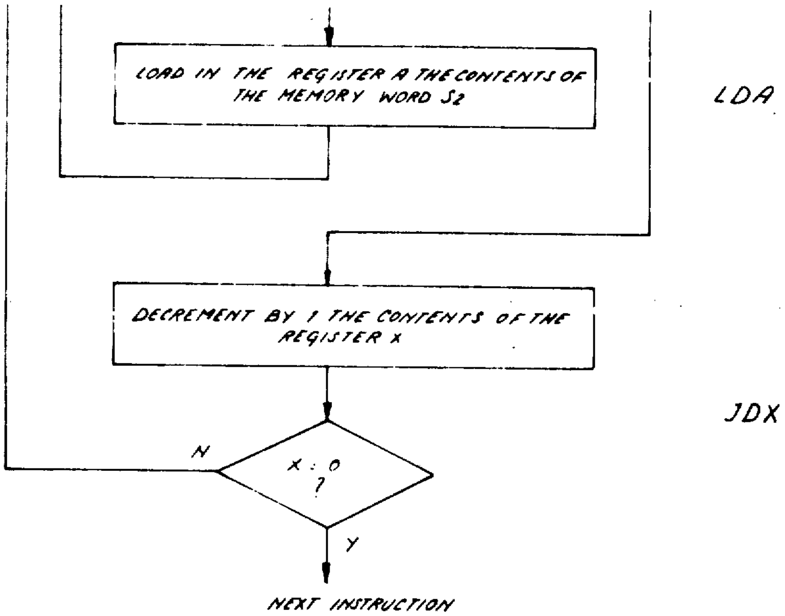

What is claimed is:

1. A data processing system with a processor and a memory (MEM) for storing a plurality of $n$-bit data words, comprising:

an index register (X) having n stages for storing in the $n - m$ last stages a relative address of a data word in a table of said memory;

an accumulator (A) having an accumulator register (AR) for storing therein said data word;

coder means (FFOC, CC) for determining the $m$-bit position of the first bit of said data word having a predetermined one of two conditions, all said bits of said word being ordered in a predetermined way, said accumulator coupled to said coder means and said m-bit position being provided at the $m$-bit output ($FO_{00}$-$FO_{03}$) of said accumulator (A);

first means for coupling said memory (MEM) and said accumulator register (AR);

means for accessing a data word from said memory table by using said relative address and for storing said word in said accumulator register (AR) via said first coupling means; and second means for coupling said $n - m$ last stages of said index register (X) and the $m$-bit output ($FO_{00}$-$FO_{03}$) of said accumulator (A) with the $n - m$ first stages and the $m$ last stages of said index register respectively, whereby said $n - m$ bit relative address of said word and said $m$-bit position of said bit in said word are combined to obtain in said index register (X) the position of said bit in said memory table.

* * * * *